(12) United States Patent
Cox

(10) Patent No.: US 11,400,783 B2
(45) Date of Patent: *Aug. 2, 2022

(54) TWIN TUBE DAMPER WITH REMOTE GAS RESERVOIR

(71) Applicant: Fox Factory, Inc., Braselton, GA (US)

(72) Inventor: Christopher Paul Cox, Capitola, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/791,420

(22) Filed: Feb. 14, 2020

(65) Prior Publication Data

US 2020/0180379 A1 Jun. 11, 2020

Related U.S. Application Data

(63) Continuation of application No. 15/788,653, filed on Oct. 19, 2017, now Pat. No. 10,569,610, which is a continuation of application No. 14/685,348, filed on Apr. 13, 2015, now Pat. No. 9,796,232.

(60) Provisional application No. 61/978,620, filed on Apr. 11, 2014.

(51) Int. Cl.
*B60G 13/06* (2006.01)
*B62K 25/04* (2006.01)
*F16F 9/06* (2006.01)

(52) U.S. Cl.
CPC .............. *B60G 13/06* (2013.01); *B62K 25/04* (2013.01); *F16F 9/065* (2013.01); *B60G 2202/24* (2013.01); *B60G 2300/12* (2013.01); *B60G 2500/10* (2013.01)

(58) Field of Classification Search
CPC .. F16F 9/342; F16F 9/467; F16F 9/348; F16F 9/06; F16F 9/064; F16F 9/088; F16F 9/096; F16F 9/26; F16F 9/44; F16F 9/145; F16F 9/185; F16F 9/512; F16F 9/003; F16F 9/18; F16F 9/20; F16F 9/34; F16F 9/516; F16F 9/062; F16F 9/068; F16F 9/065; F16F 2222/02; F16F 2230/10; B60G 2202/24; B60G 2300/12; B60G 2500/10; B62K 25/04; B62K 25/08
USPC ............ 188/269, 318, 266.2, 297, 298, 378
See application file for complete search history.

(56) References Cited

U.S. PATENT DOCUMENTS

| | | | |
|---|---|---|---|
| 2,944,639 A * | 7/1960 | Blake | F16F 9/516 188/269 |
| 4,732,244 A * | 3/1988 | Verkuylen | F16F 9/446 188/315 |
| 6,863,163 B2 | 3/2005 | Oliver et al. | |
| 7,766,138 B2 | 8/2010 | Sintorn | |
| 9,796,232 B2 | 10/2017 | Cox | |

(Continued)

*Primary Examiner* — Robert A. Siconolfi
*Assistant Examiner* — San M Aung

(57) ABSTRACT

A damper is provided having a twin tube construction interconnected to a gas reservoir. The connection of each of the inner and outer volumes of the twin tube to the gas reservoir is independently valved, and each of these valves are independently settable to change the differential pressure thereacross at which they open. The damper provides flow passages directly from the inner and outer volumes to enable flow form the compression to rebound sides thereof, as well as through the valved connections to the gas reservoir and at least one valved opening in the damper piston.

20 Claims, 11 Drawing Sheets

(56) References Cited

U.S. PATENT DOCUMENTS

| | | | |
|---|---|---|---|
| 2004/0040806 A1* | 3/2004 | Oliver | B60G 17/044 188/315 |
| 2007/0144848 A1* | 6/2007 | Saito | F16F 9/061 188/314 |
| 2008/0023935 A1* | 1/2008 | McAndrews | F16F 9/516 280/283 |
| 2009/0145706 A1* | 6/2009 | Sintorn | B60G 15/061 188/266.2 |
| 2010/0018818 A1* | 1/2010 | Ishii | F16F 9/065 188/319.1 |
| 2011/0017559 A1* | 1/2011 | Sintorn | F16F 9/096 188/314 |
| 2011/0221108 A1* | 9/2011 | Uchiyama | F16F 9/5126 267/217 |
| 2012/0018263 A1* | 1/2012 | Marking | B60G 13/08 188/266.2 |
| 2012/0205206 A1* | 8/2012 | Chen | F16F 9/096 188/269 |
| 2014/0054122 A1* | 2/2014 | Coaplen | F16F 9/3257 188/322.13 |
| 2018/0043742 A1 | 2/2018 | Cox | |

\* cited by examiner

TWIN TUBE DAMPER WITH REMOTE GAS RESERVOIR

CROSS-REFERENCE TO RELATED APPLICATIONS

This application claims the benefit of and claims priority to the co-pending U.S. patent application Ser. No. 15/788,653 filed on Oct. 19, 2017, entitled "TWIN TUBE DAMPER WITH REMOTE GAS RESERVOIR" by Christopher Paul Cox, assigned to the assignee of the present application, and is hereby incorporated by reference in its entirety.

The application with Ser. No. 15/788,653 claims the benefit of and claims priority to the U.S. patent application Ser. No. 14/685,348 filed on Apr. 13, 2015, now U.S. Issued U.S. Pat. No. 9,796,232, entitled "TWIN TUBE DAMPER WITH REMOTE GAS RESERVOIR" by Christopher Paul Cox, assigned to the assignee of the present application, and is hereby incorporated by reference in its entirety.

The application Ser. No. 14/685,348 claims the benefit of and claims priority to the U.S. Provisional Patent Application No. 61/978,620 filed on Apr. 11, 2014, entitled "TWIN TUBE DAMPER WITH REMOTE GAS RESERVOIR" by Christopher Paul Cox, assigned to the assignee of the present application, and is hereby incorporated by reference in its entirety.

BACKGROUND OF THE INVENTION

Field of the Invention

The present disclosure relates to the field of dampening devices for vehicles, such as bicycles, motorcycles and four or greater wheeled vehicles. In a further aspect, the disclosure relates to fluid dampers having lower incidence of cavitation and predictable and user variable, separate, compression and rebound characteristics.

Description of Related Art

Vehicle suspension systems typically include a spring component or components and a damping component or components. Typically, mechanical springs, such as metal leaf or helical springs, have been used in conjunction with some type of viscous fluid based damping mechanism mounted functionally in parallel. Dampers commonly include a housing forming a generally fixed volume chamber having a piston therein, which is attached to a suspension component by a rod or shaft attached thereto and extending from the chamber, and which piston moves axially within the chamber to dampen the impact of a suspension force event, such as a bump or obstruction in terrain over which the vehicle is moving. The damper typically operates by restricting the flow of working fluid across or through the piston as it traverses the chamber to slow the movement of a piston therein, especially during a compression stroke. The fluid flow restriction elements, because they are located on the piston which is sealed within the housing, are typically not user adjustable, and are also typically preset for "average" use conditions and thus are not adaptable to varying conditions.

One variant of the above described damper construct employs a gas reservoir which is coupled to the fluid of the damper across a floating piston. The gas reservoir provides a pressure reservoir source which is useful to cause the piston in the damper chamber to return to a steady state position after a compression event, also known as rebounding. During a compression event, the physical size of the fluid volume on the rebound side of the piston may rapidly increase, and if the fluid flow rate into the rebound chamber is not sufficiently fast, the pressure will drop in the fluid on the rebound side of the chamber to a level where any gas, such as air, entrained in the fluid will aspirate to reform a gas state thereof, causing cavitation in the fluid. This can cause serious disruption in the proper operation of the damper, and unacceptable noise emanating from the damper.

SUMMARY OF THE INVENTION

There is provided herein a fluid damper having a fluid volume bifurcated into a compression and a rebound volume by a fluid piston, and a secondary fluid volume. The bifurcated fluid volume is directly communicable with the secondary fluid volume, to enable fluid communication and flow between the rebound and compression volumes, as well as communicable between the compression and rebound volumes through one or more valved openings in the piston. A gas reservoir is provided, and the gas reservoir is directly communicable to the compression fluid volume, and is in fluid communication with the rebound volume via the secondary fluid volume. The communication of at least one of the compression and rebound fluid volumes with the gas reservoir is valved to selectively enable or disable fluid communication therewith.

The valves, configured to selectively enable and disable communication between the gas reservoir, are set to open based upon a difference in pressure thereacross, which may be adjustable. Where both the compression and rebound volume communication to the gas reservoir is valved, the pressure at which the valves open may be independently set with respect to one another. In one aspect, the pressure at which the valve will open is set by urging a secondary force against a shim overlying an opening in the valve, and a different setting of such force provide the variation in the opening pressure setting of the valve. Additionally, the direct communication pathway between the compression and rebound volumes may have a variable size, which changes as the piston traverses the damper. This may be provided by positioning a plurality of openings through a tube through which the damping piston moves, the openings spaced apart from one another in the direction of piston travel, the openings communicable ultimately from the bifurcated fluid volume to the secondary fluid volume, and from the secondary fluid volume, to the rebound volume of the bifurcated fluid volumes. As the piston traverses the tube, different ones of openings communicate between the rebound and compression sides of the bifurcated fluid volume.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EMBODIMENTS

A dampening device, such as a strut or shock absorber, generally includes a tube shaped housing within which a piston, disposed on an end of a piston rod which extends outwardly of the housing, moves in response to forces imposed on the housing and the rod, the movement dampened by the presence of a fluid in the housing passing through valved openings in the piston, a secondary reservoir fluidly connected to the tube, and a connecting portion interconnecting the fluid portion f the tube and the secondary reservoir. Fluid is enabled to move between the housing and the secondary reservoir, in response to movement of the piston inwardly and outwardly of the housing. Fluid on one side of the piston is able to move through the piston, to the fluid volume on the opposite side of the piston, through one or more check valves within the body of the piston. The rate of fluid flow between the fluid volumes on either side of the piston, and between the fluid volumes in the dampening member housing and the secondary reservoir, affects the dampening effect of the dampening device upon the vehicle in which it is used.

Figure 1:
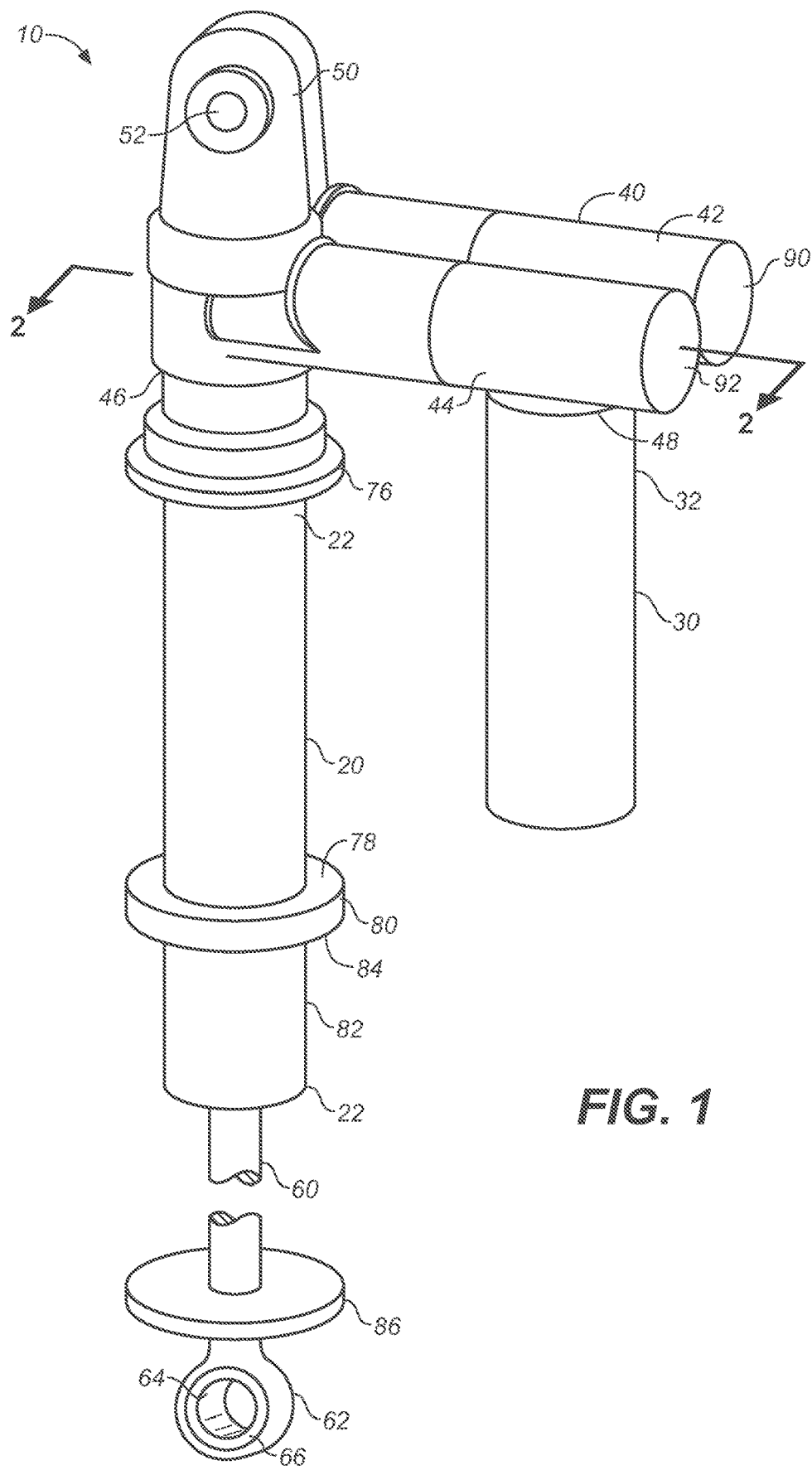
FIG. 1 is a schematic perspective view of an embodiment of the fluid damper hereof, in accordance with an embodiment.

Referring now to FIG. 1, a perspective view of the exterior structure of such a damper cylinder 20 and a remote reservoir 30 are fluidly interconnected through a valved interconnection housing 40 which also bounds one end of the internal pressurizable volumes of the damping cylinder 20 and of the remote reservoir 30. The valved interconnection housing also includes an attachment projection 50 through which a busing 52 extends, for attaching the attachment projection 50, and thus one end of the dampening cylinder 20, to a suspension or vehicle frame component. At the end 22 of the damping cylinder 20 opposite to the connection thereof to the valved interconnection housing 40, a piston rod 60 extends. The distal end 62 of the piston rod 60 surrounds a bushed opening 64, through which a bushing 66 extends. The distal end 62 of the piston rod 60 is thereby interconnected to the other of one of a vehicle frame or suspension components via the busing 66.

The damper 10 is also configured to carry a secondary spring element, specifically a mechanical coil spring 70, for clarity of the later Figures shown only in FIG. 2, which provides additional rigidity and compression damping and rebounding force in the damper 10. In this embodiment, the mechanical coil spring 70 is bifurcated into an upper spring 72 and a lower spring 74. The upper spring 72 extends between, and bears against, an upper annular spring plate 76 secured to the outer surface of the body of the damping cylinder 20, and an upper surface 78 of an intermediate annular spring plate 80, which extends circumferentially outwardly around the circumference of a spring sleeve 82, which is configured and sized to fit over, but freely move in an axial direction over, the damping cylinder 20. The second, lower spring 74 extends from contact with the underside annular surface 84 of the intermediate annular spring plate 80, and into contact with a lower annular spring flange 86 extending outwardly from, and circumferentially around, the piston rod 60 adjacent to, but spaced in the damping cylinder 20 direction from, the distal end 62 thereof.

Referring again to FIG. 1, the valved interconnection housing 40 also includes two extensions or bosses 42, 44 which provide valved flow passages (not shown in this Figure) which extend from the damping cylinder 20 side to the remote reservoir 30 side of the valved interconnection housing 40, and, extending approximately normal to the extending direction of bosses 42, 44, an internally threaded boss 46, into which the upper end 22 of the damping cylinder 20 is secured and which is fluidly connected to the flow passages and a second boss 48, having a threaded projection 49 thereon (FIG. 2), over which the upper end 32 of the remote reservoir 30 body is secured and the interior of which is fluidly connected to the flow passage. Thus, as will be shown in greater detail in regard to FIG. 2 hereof, upon the movement of the piston rod 60 inwardly of the damping cylinder 20, fluid within the damping cylinder 20 may flow from the compression volume in the interior of the damping cylinder 20, through a flow passage in the valved interconnection housing 40, and hence into the remote reservoir 30. Also, during a compression stroke, valves 90, 92 enable flow of fluid through the valved interconnection housing 40, and communication of fluid pressure, at the gas reservoir pressure, to the rebound side of the piston. Likewise, upon retraction of the piston rod 60 from the body of the damping cylinder 20, fluid may flow from adjacent the gas piston 36 in the remote reservoir 30, through a flow passage in the valved interconnection housing 40 and then into the compression volume of the damping cylinder 20, and fluid, and fluid may flow from the rebound side of the damping cylinder 20 to the remote reservoir 30, i.e., back through the valved interconnection housing 40. The selectable restriction to flow of fluid inwardly and outwardly of the remote reservoir 30 is provided by valves 90, 92, shown schematically on FIG. 1, which will be discussed in further detail herein.

Figure 2:
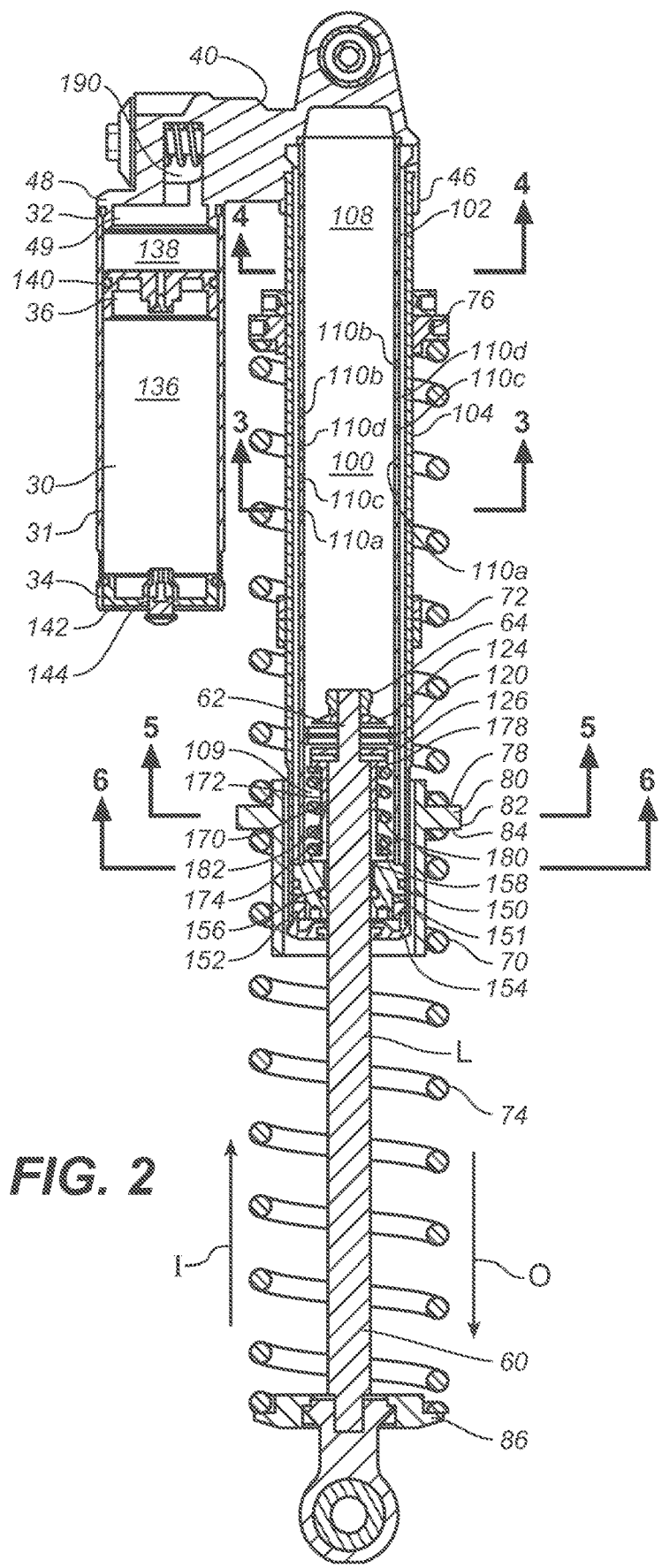
FIG. 2 is a sectional view of the fluid damper of FIG. 1, showing the details of the interior thereof, in accordance with an embodiment.
Figure 3:
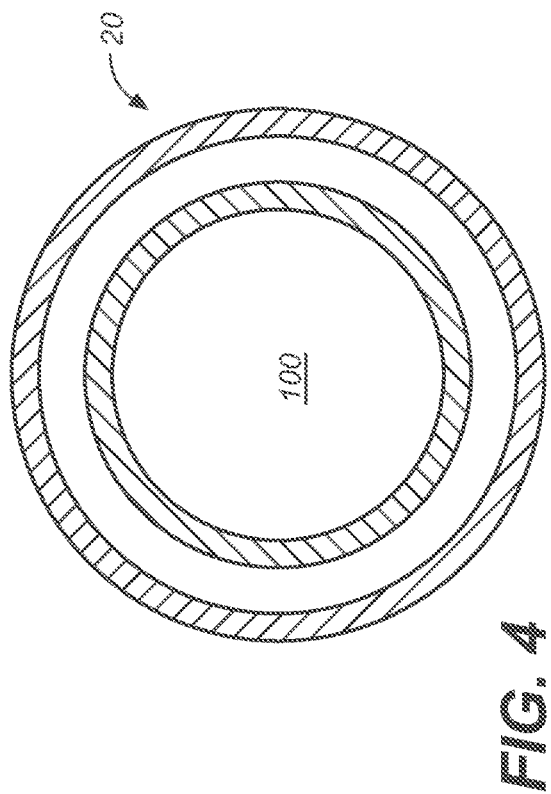
FIG. 3 is a sectional view of the fluid damper of FIG. 2 at section 3-3, in accordance with an embodiment.
Figure 4:
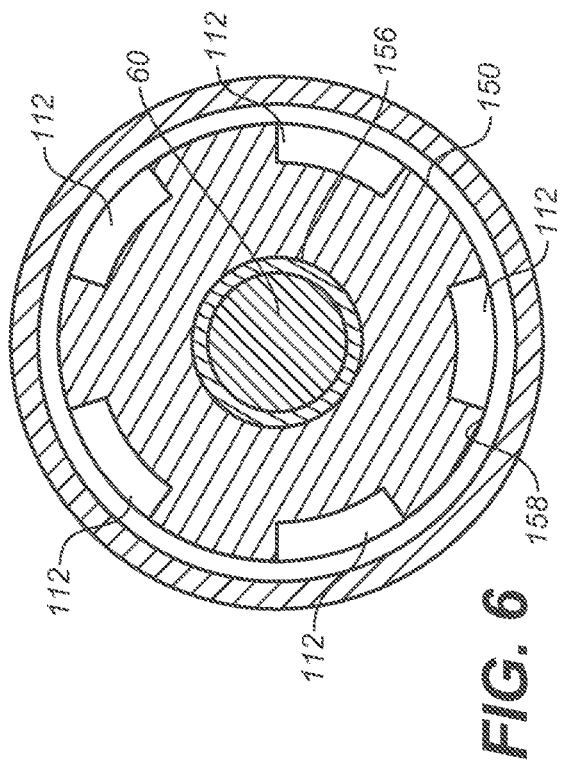
FIG. 4 is a sectional view of the fluid damper of FIG. 2 at section 4-4, in accordance with an embodiment.
Figure 5:
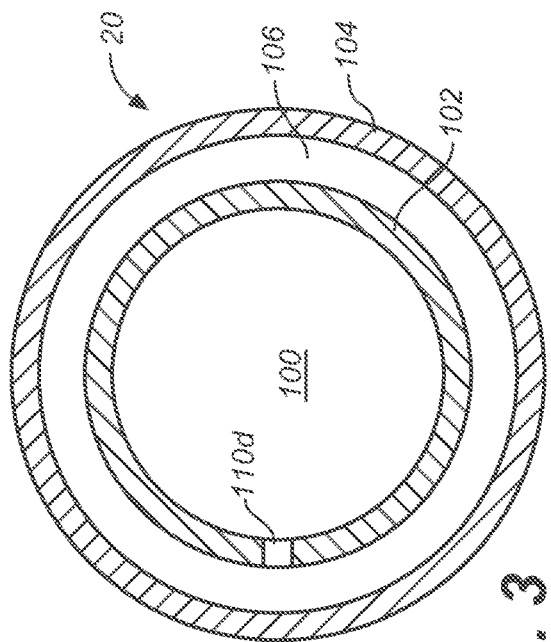
FIG. 5 is a sectional view of the fluid damper of FIG. 2 at section 5-5, in accordance with an embodiment.

Referring now to FIG. 2, details of the interrelationship of the damping cylinder 20 and the remote reservoir 30 are shown, wherein the damping cylinder 20, the remote reservoir 30, and the valved interconnection housing 40 are shown in cutaway across a portion of the valved interconnection housing 40 intermediate of the two valves 90, 92 thereon. As discussed previously herein, a mechanical coil spring 70 member having upper and lower springs 72, 74 is disposed about the exterior of the damper cylinder 20. The damper 10 has a main volume 100, surrounded by an inner tube 102, and an annular volume 106 (FIGS. 3 and 5), formed between the inner tube 102 and an outer tube 104. The openings in the internally threaded boss 46 and second boss 48 of the interconnection housing 40 enable fluid communication by and between the inner tube 102 volume and the annular volume 106 of the damping cylinder 20 and the remote reservoir 30, as will be described in detail herein.

Referring now to FIGS. 2 to 6, the construction of the damping cylinder 20 is shown. The fluid volume within the inner tube 102 is bifurcated by the piston 120 into two variable volumes: a compression volume 108 between the piston 120 and the opening of the damping cylinder 20 into the valved interconnection housing 40, and a rebound volume 109 which extends between the opposite side of the piston 120 to the inner face of seal housing 151. Additionally, to provide one of the fluid pathways for fluid communication between the compression volume 108 and the rebound volume 109, a plurality of openings 110a-d are provided through the wall of the inner tube 102 between the inner volume of the inner tube 102 and the annular volume 106, and a plurality of passages 112 (the plurality shown in FIG. 6) are provided at the interconnection location of inner tube 102 and the seal housing 151. Thus, during movement of the piston 120 within the inner tube 102, fluid may flow between the compression volume 108 and the rebound volume 109 portions of the inner tube 102 as the actual volume (size) of those volumes change as the piston 120 moves within the inner tube 102, from openings 110a-d through the annular volume 106 and into the rebound volume 109 through the passages 112, and, if the piston 120 is disposed intermediate of the openings 110a-d, for example, wherein opening 110a is on one side of the piston 120 and opening 110d is on another side of the piston 120, flow may occur therethrough between the rebound and the compression volumes 109 and 108, respectively. These un-valved openings 110, and passages 112 thus provide a direct, though restricted by the cross section and of the openings, flow pathway for fluid between the compression volume 108 and the rebound volume 109 during piston 120 movement within the inner tube 102.

The openings 110 are configured as a plurality of larger openings 110a, b and smaller openings 110c, d and are provided in and through the wall of the inner tube 102 to communicate the main volume 100 (the compression volume 108 and the rebound volume 109) of the damper 10 with the annular volume 106 of the damper 10. In this embodiment, as shown in FIG. 2, a large upper and a large lower opening, 110a, 110b are disposed through the inner tube 102 along the sides of the inner tube 102 to either side of the inner tube 102, i.e., diametrically opposed across the circumference of the inner tube 102, and two smaller upper and lower openings 110c and 110d are located therebetween, i.e., between each pair of large openings 110a, b. Additionally, the openings 110a-d on one side of the inner tube 102, e.g., to the right hand side of the inner tube 102 are offset, in the direction of the stroke of the piston 120 toward the valved interconnection housing 40, as compared to the location of the openings 110a-d to the left hand side of the inner tube 102, but the spacing between the adjacent openings 110a-d to either side of the inner tube 102 is the same. As a result, the openings are staggered along the longitudinal axis L of the inner tube 102. Thus, when a piston, such as piston 120 located within inner tube 102 traverses within the inner tube 102 in the direction of the valved interconnection housing 40, individual ones of the openings 110a-d will be encountered and selectively blocked by the piston 120, and as the piston 120 passes an opening, the number of openings 110a-d available to form a communication path from the annular volume 106 from the compression volume 108 on one side of the piston 120 to the rebound volume 109 on the other side of the piston 120, and vice-versa, will change.

Referring to FIGS. 2, and 7 to 10, the piston 120 is received over a reduced diameter, at least partially threaded, end portion 63 of the piston rod 60, and fixedly connected thereto by virtue of the nut 65 or other fastener threadingly secured on the reduced diameter end portion (distal end 62) to secure the piston 120 between the underside of the nut 65 and a circumferential shoulder 67 on the piston rod 60. The shim 124 is secured by the underside of the nut 65 against the compression side face of the piston 120, and the circumferential shoulder 67 and the rebound side face of the piston 120. The piston 120 includes about the outer circumference thereof a plurality of ring shaped lip or other types of seals 122, to enable sealing of the piston 120 against the inner surface of the inner tube 102 and thus across the piston 120 between the compression volume 108 and the rebound volume 109. Additionally, the piston 120 is configured to enable flow therethrough based upon the pressure difference between the compression volume 108 and rebound volume 109. This is enabled, in this embodiment, by the use of "shims" 124, 126, on either side of the piston 120, which are configured to selectively overlay one or more piston openings 128, 130 extending through the piston 120 to selectively open fluid communication between the rebound and compression volumes 109 and 108, respectively. The stiffness of the shims, and the number and configurations of the shims, determines the differential pressure at which the shim will bend away from the piston openings 128 or 130 and thus allow fluid flow from a higher pressure volume to a lower pressure volume directly there through.

Figure 7:
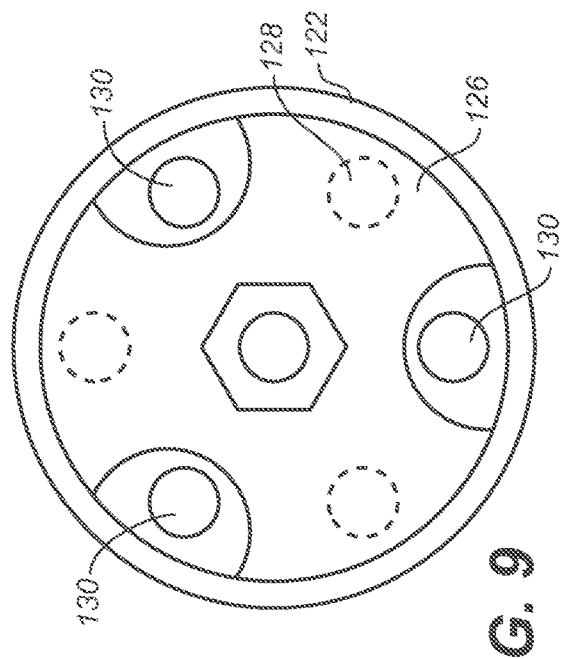
FIG. 7 is a perspective view of the piston of the damper of FIG. 2, in accordance with an embodiment.
Figure 10:
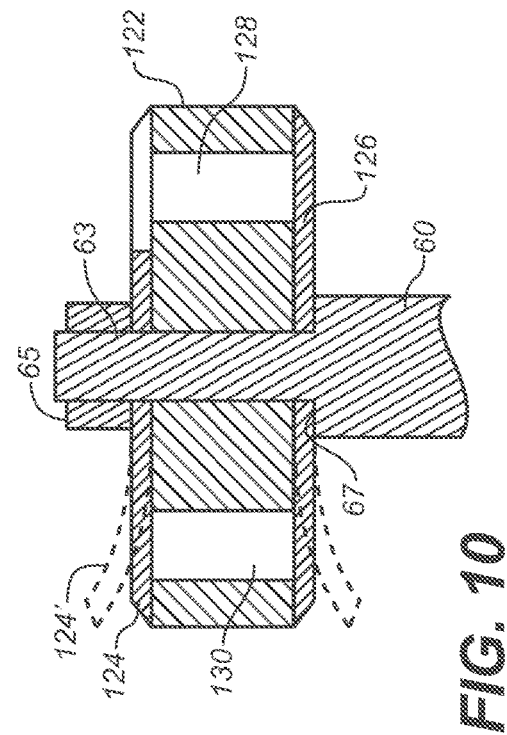
FIG. 10 is a sectional view of the piston of FIG. 7 at section 10-10, in accordance with an embodiment.
Figure 9:
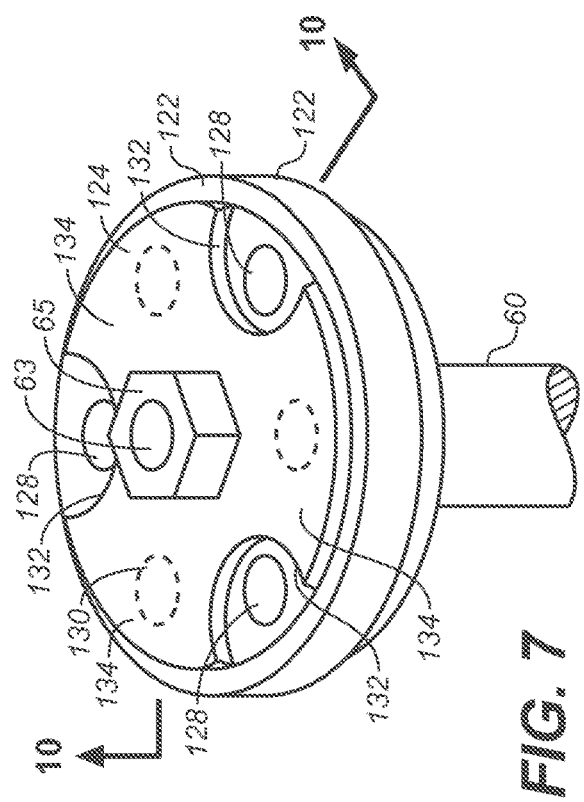
FIG. 9 is a bottom plan view of the piston on FIG. 7, in accordance with an embodiment.
Figure 8:
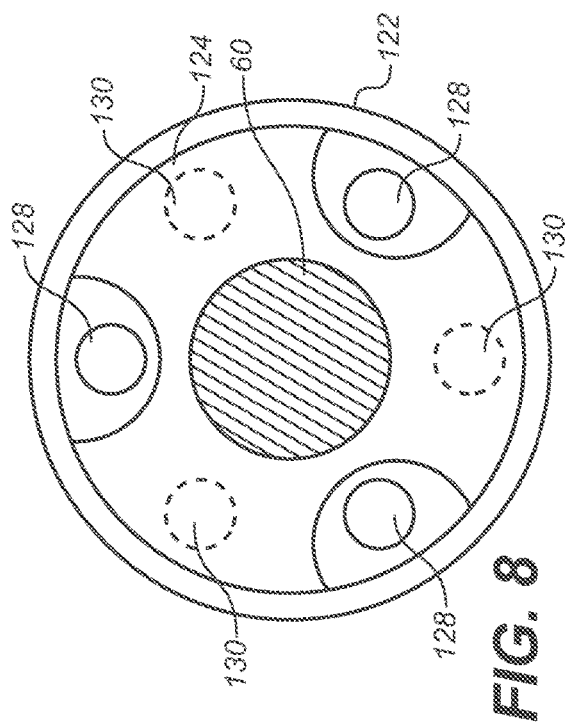
FIG. 8 is a top plan view of the piston of FIG. 7, in accordance with an embodiment.

In the embodiment shown, each of shims 124 and 126 are substantially identical in construct, and are a thin, stiff, but flexible material, such as thin shell sheeting, which is cut or stamped into a trilobular shape as shown in FIG. 8 such that a cutout 132 is provided in three locations equally spaced about the diameter of the shim 124, 126, such that the cutout 132 aligns with every other piston opening 128, 130 about a circumference of the face of the piston 120 and a valve plate portion 134 located between the cutouts 132 positioned to overlay one of each of the openings 128, 130 on one side of the piston 120. As shown in FIG. 7, cutouts 132 in the shim 124 are positioned on the compression volume 108 side of the piston 120 to enable unrestricted access of fluid into the piston openings 128 of the piston 120, but position the valve plate portions 134 to overlay the piston openings 130 (shown in outline). Likewise, the shim 126 (FIG. 9) includes cutouts which expose piston openings 130 exposed to the compression volume 108 at the rebound volume 109 side thereof. As shown in FIGS. 10 and 124', when the pressure in the rebound volume 109 is sufficiently greater than that of the compression chamber, the valve plate portions 134 of the shim 124 may bend away from the surface of the piston 120 to enable communication through the piston openings 130, in this case the piston opening 130, which communication would otherwise be prevented by the presence of the valve plate portion 134. Likewise, a sufficiently higher pressure in the compression volume 108, as compared to the rebound volume 109, will similarly result in the valve plate portion 134 of the shim 126 to bend away from the surface of the piston 120 to enable fluid communication between the compression and rebound volumes, 108 and 109, respectively, via the piston openings 128.

Referring again to FIG. 2, the remote reservoir 30 is configured to include a gas reservoir and to enable fluid to be received therein, adjacent to but sealed from the gas reservoir, from the damping cylinder 20, and is configured as a generally circular tube 31 having a first threaded end 32 threadingly attached to the threads on the threaded projection 49 of the second boss 48 of the valved interconnection portion 40, and an opposed threaded end 34, within which is threadingly received in a fill valve housing 142 having a fill valve 144 extending therethrough. A floating piston 36 (e.g., gas piston) is received within the circular tube 31, such that a gas volume 136 and a fluid volume 138 are defined at the opposed surfaces of the floating piston 36. The floating piston 36 includes an o-ring or other type of seal 140 within, and extending from, a groove about its circumference to seal the gap between the floating piston 36 and the inner wall of the circular tube 31 of the remote reservoir 30, and the floating piston 36 is not configured to enable deliberate flow of fluid or gas therepast. The gas volume is typically filled with nitrogen or another gas, the pressure of which is user settable at the fill valve 144.

During a compression stroke of the piston 120 within the damping cylinder 20, i.e., a movement of the piston 120 inwardly of the tube in the direction I of FIG. 2, fluid in the compression volume 108 of the damping cylinder 20 can flow through the valved interconnection housing 40 and into the fluid volume 138 of the remote reservoir 30, resulting in movement of the floating piston 36 in the direction of the fill valve 144 to decrease the size of the gas volume 136. Additionally, fluid in the fluid volume 138 may communicate through the valved interconnection housing 40 to the annular volume 106 of the damper 10, and thus with the rebound volume 109 of the damper 10. Likewise, during a rebound stroke of the piston 120, wherein the piston 120 moves in the damping cylinder 20 in the direction O of FIG. 2, fluid in the fluid volume 138 of the reservoir may move through the valved interconnection housing 40 and into the compression volume 108 of the damping cylinder 20, and the fluid pressure in the fluid volume 138 may communicate, and fluid may flow, through the valved interconnection portion 40 to the compression volume 108 of the piston 120. This functionality, as will be described further herein, enables maintenance of the same fluid pressure, or nearly the same fluid pressure, on either side of the piston 120, and thus pressure drops in the rebound volume 109 during a high piston velocity, and hence rapid increase in the rebound volume 109, can be prevented or significantly ameliorated.

Figure 6:
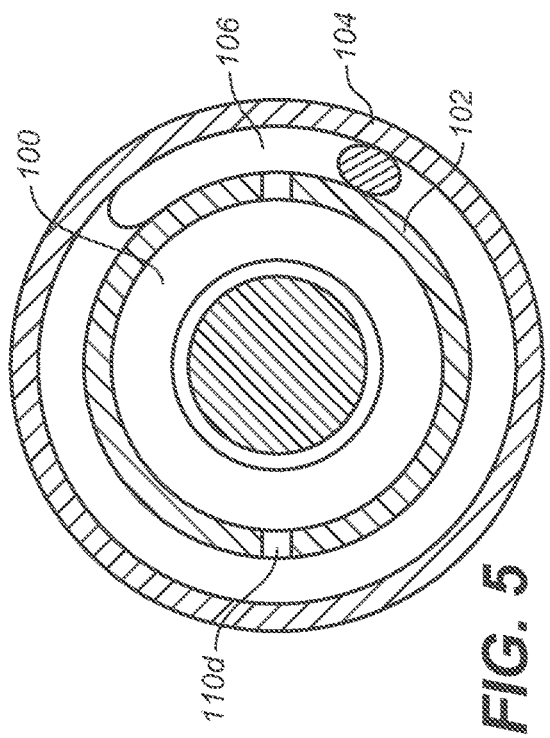
FIG. 6 is a sectional view of the fluid damper of FIG. 2 at section 6-6, in accordance with an embodiment.

Referring now to FIGS. 2 and 6, the lower piston rod 60 receiving portion of the damping cylinder 20 is sealed by a seal housing 151 located adjacent to, and slightly inwardly of, the lower end 152 of the outer tube 104 of the damping cylinder 20, and which is secured within the outer tube 104 by a cover 154 which is threadingly secured within the lower end 152 of the outer tube 104. The seal housing 151 includes an inner, sealed bore 156 within which a sleeve shaped seal 158 extends in the axial direction of the piston rod 60. The plurality of passages 112 extend as notches or recesses over a span of the outer circumference of the seal housing 151 to enable flow between the annular volume 106 and the rebound volume 109 as described herein previously.

The innermost surface of the seal housing 151 is received within the lowermost end of the outer tube 104. The passages 112 communicate through the annular volume 106, and thus, when the piston 120 is moving in a compression stroke, fluid may flow between the openings 110 on the compression volume side of the piston and the rebound volume, and vice-versa.

Referring now to FIG. 2, the lower end of the inner tube 102 also includes a bifurcated landing spool 170 configured as a pair of thin walled upper cylindrical body 172 and thin walled lower cylindrical body 174, each having an outwardly projecting flange 178 at the opposed ends of the bifurcated landing spool 170. A spring 180 is secured between the flanges 178, and in a free state, maintains a gap 182 between the cylindrical bodies 172, 174. During a rebound stroke of the damping cylinder 20, as the piston 120 is moving in the direction of the seal housing 151 end of the inner tube 102, the underside of the piston 120 may land against the flange 178 of the thin walled upper cylindrical body 172, and then be further damped in the rebound direction by the spring 180.

Figure 11:
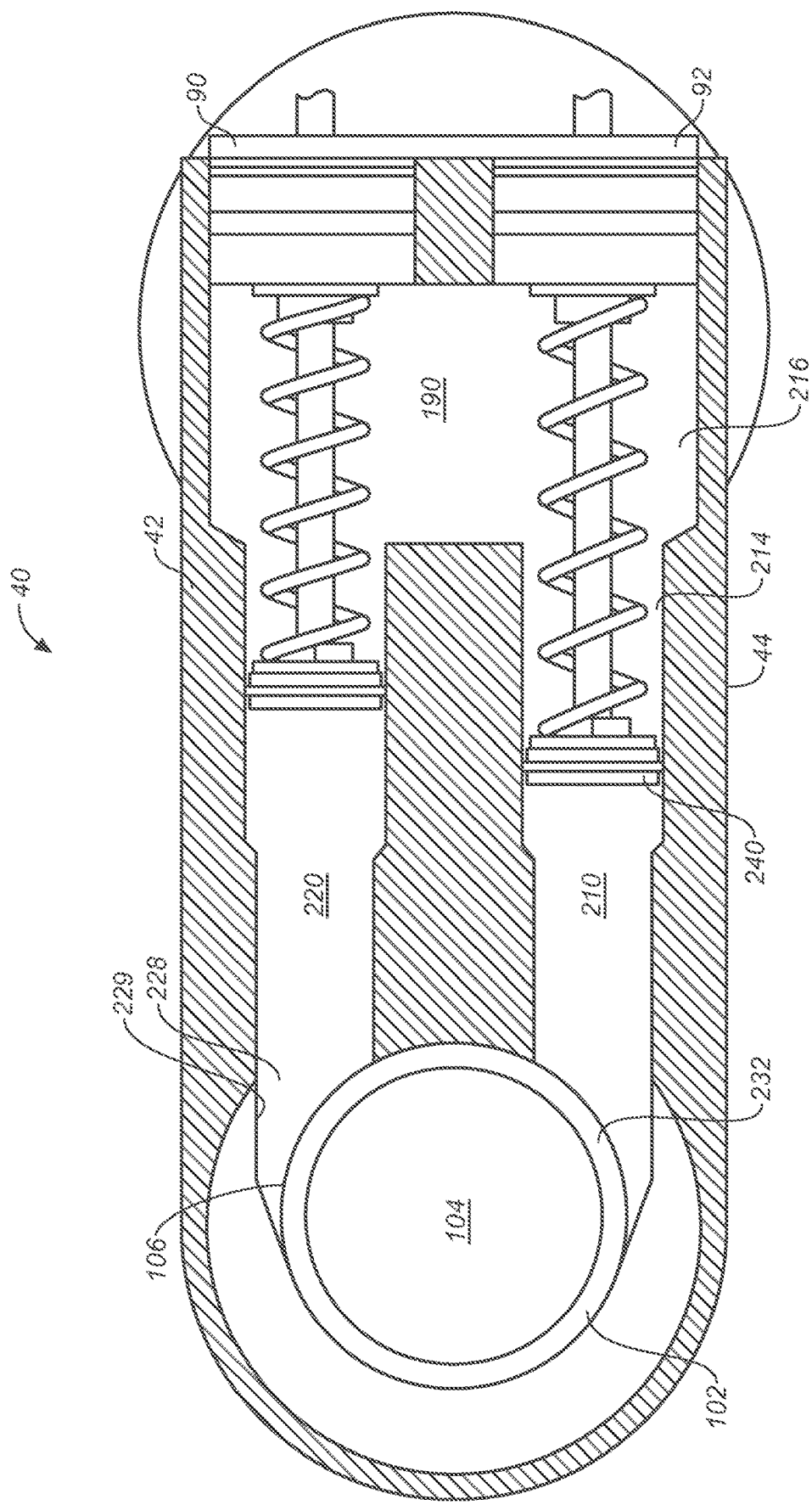
FIG. 11 is a sectional view of the interconnection housing of FIG. 1 at section 11-11, in accordance with an embodiment.

Referring now to FIG. 11, details of the structure of the valved interconnection housing 40 are shown. The valved interconnection housing 40 is configured to form two different paths for the flow and communication of fluid between the fluid volume 138 of the remote reservoir 30 and the compression and rebound volumes 108, 109, respectively, of the damping cylinder 20. Specifically, the valved interconnection housing 40 is configured to include a rebound valve 90 and compression valve 92, such that the compression valve 92 provides selectable throttling of the fluid flow from the damping cylinder 20 to the remote reservoir 30, and the rebound valve 90 provides selectable throttling of a return flow path to the rebound volume 109 of the damping cylinder 20 to selectively throttle the flow of fluid from the remote reservoir 30 to the rebound volume 190 through the annular volume 106 of the damping cylinder 20. Additionally, during a compression stroke of a damping stroke, in the intermediate housing, within the valved interconnection housing 40 at the opening to the fluid volume 138 (FIG. 2) between the valves 90, 92 an open area 190 is formed where fluid from and to the rebound and compression volumes 109, 108, respectively, of the damping cylinder 20 leaving or entering the fluid volume 138 of the remote reservoir 30 may pass or intermingle and thus, fluid entering the open area 190 may pass during a compression stroke through the compression valve 92 and into the fluid volume 138 and open area 190 to compress the gas volume 136, and, if sufficient fluid pressure is present at the open area 190 as a result of the fluid flowing thereinto during a compression stroke, the fluid may flow through the rebound valve 90 and into the annular volume 106 of the damping cylinder 20 and thus to the rebound volume 109. Likewise, the reverse may occur, wherein during a rebound stroke, fluid moves through the annular volume 106 and through the rebound valve 90 to the fluid volume 138 of the remote reservoir 30, and, if the pressure in the fluid volume 138 is sufficiently high, the fluid may pass through the compression valve 90 and into the compression volume 108. As a result, the pressure in the lower pressure portion of the damping cylinder 20, as among the rebound and the compression volumes, 109 and 108, respectively, will be maintained at or nearly at the gas pressure in the gas volume 136, and thus cavitation in the fluid caused by the fluid pressure therein being insufficient to maintain entrained gas in liquid form will not occur.

The valved interconnection housing 40, shown in the section in FIG. 11, is configured to enable separate flows of fluid from the rebound and compression volumes 109 and 108, respectively, of the damping cylinder 20 to the face (damping cylinder side of the fluid flow path) of the rebound valve 90 and the compression valve 92, and after flowing through one of the rebound or compression valves 90 and 92, respectively, into the open area 190 of the valved interconnection housing 40. To enable this flow construct, the valved interconnection housing 40 includes two valved conduits 210 and 220, one of each communicating with one of the compression volume 108 and the rebound volume 109 (through the annular volume 106) to the open area 190. Each valved opening is configured to restrict fluid flow, between the damping cylinder volumes and the open area 190 in both directions of flow, and each flow direction to each of the compression volume 108 and the rebound volume 109 is separately throttled through a check valve structure, in the embodiment shown in FIG. 11, a shim type valve structure (best shown in FIG. 18).

Figure 14:
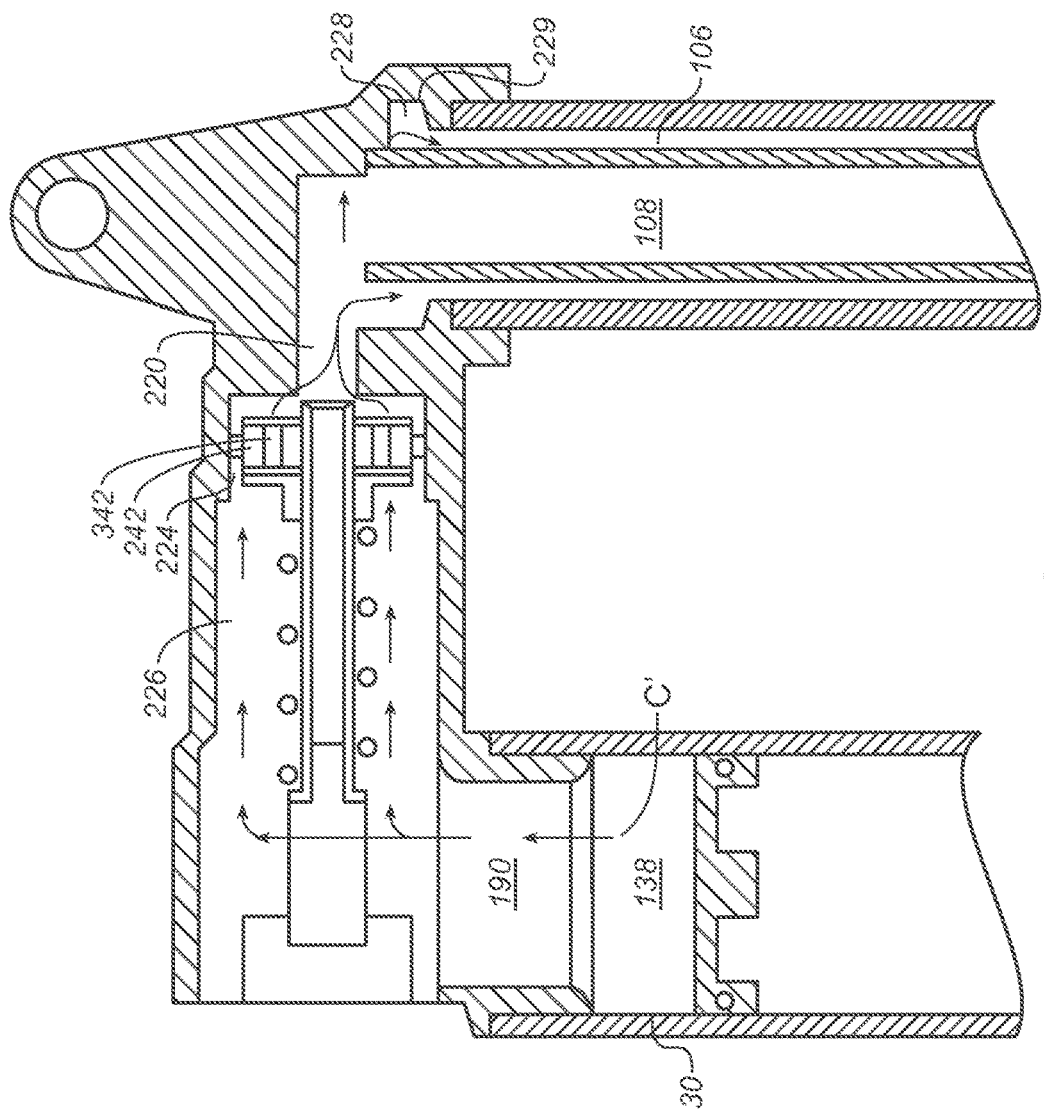
FIG. 14 is a partial sectional view of the interconnection housing of FIG. 1 offset from section 12-12, in accordance with an embodiment.

Referring now to FIGS. 11 to 14, to provide a flow pathway from the compression volume 108 of the damping cylinder 20 to the open area 190, the valved interconnection housing 40 includes an upper inner tube recess 230 into which the upper end 232 of the inner tube 102 of the damping cylinder 20 extends and a ring or other seal arrangement seals the connection of the inner tube 102 into the recess 230. To one side of the recess 230 is provided a compression side flow passage 210 (also known as the valve conduit 210), which extends from and is in open fluid communication with the upper end 232 of the inner tube 102 to an enlarged valve bore 214, within which a compression piston valve 240 is slidingly positioned. The valve bore 214 extends past the compression piston valve 240 and into a larger bore 216 which is in direct fluid communication with the open area 190 of the valved interconnection housing 40. As shown in FIGS. 11 and 14, surrounding the upper end 232 of the inner tube 102 is an annular manifold 228, which is bounded by the outer wall of the upper end of the inner tube 102 and a circumferential inner wall 229 of the valved interconnection housing 40, and which is in open communication with the valve conduit 220 (also known as the rebound side valve passage 220), the opening thereinto opposite to the opening of the inner tube into the compression side flow passage 210 within the valved interconnection housing 40. The valve conduit 220 opens into an enlarged valve bore 224, within which a rebound side valve piston 242 is slidingly positioned. The enlarged valve bore 224 extends past the rebound side valve piston 240 and into a large bore 226 which is in direct fluid communication with open area 190 of the valved interconnection housing 40.

Figure 12:
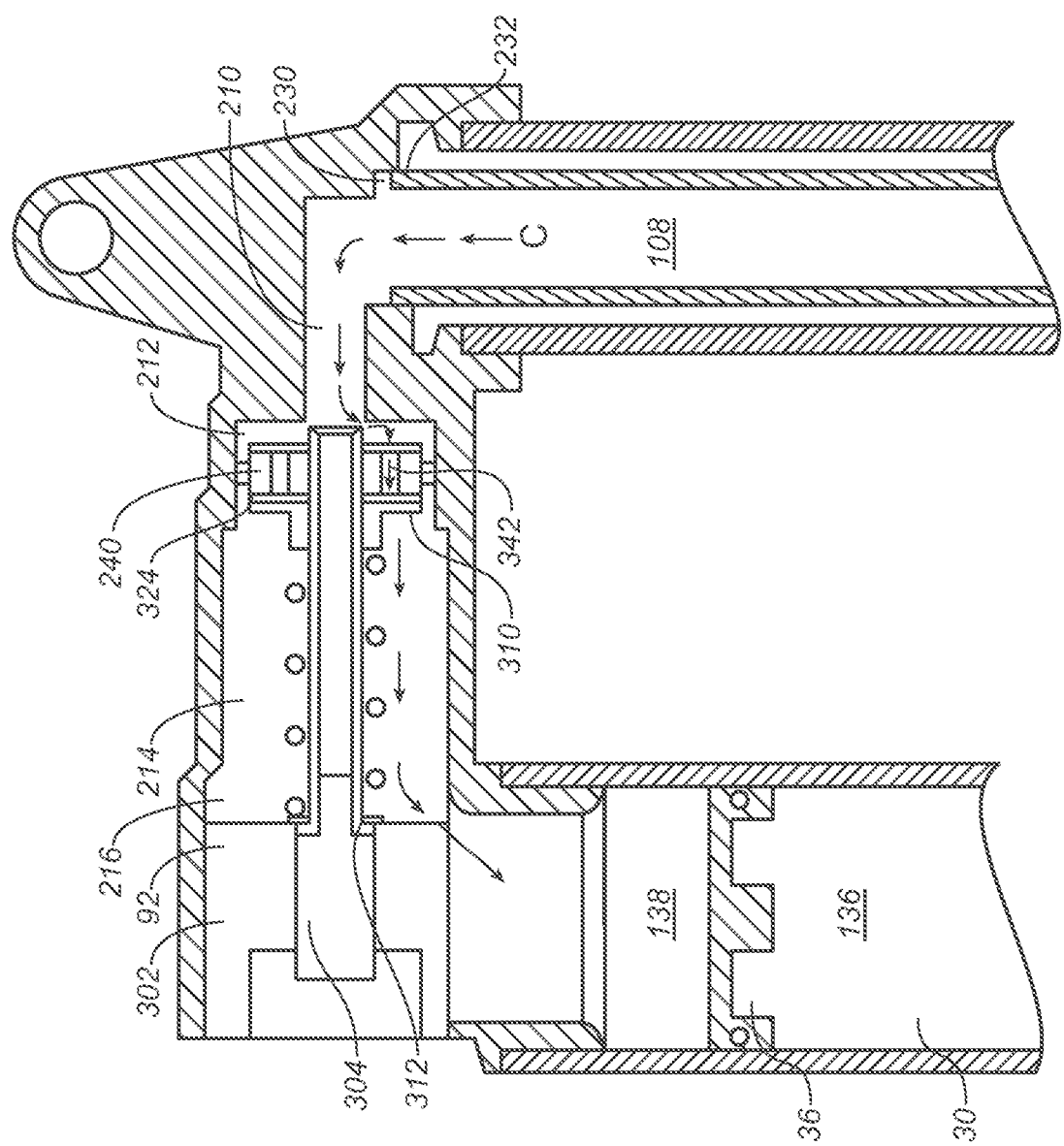
FIG. 12 is a partial sectional view of the interconnection housing of FIG. 1 at section 12-12, in accordance with an embodiment.
Figure 13:
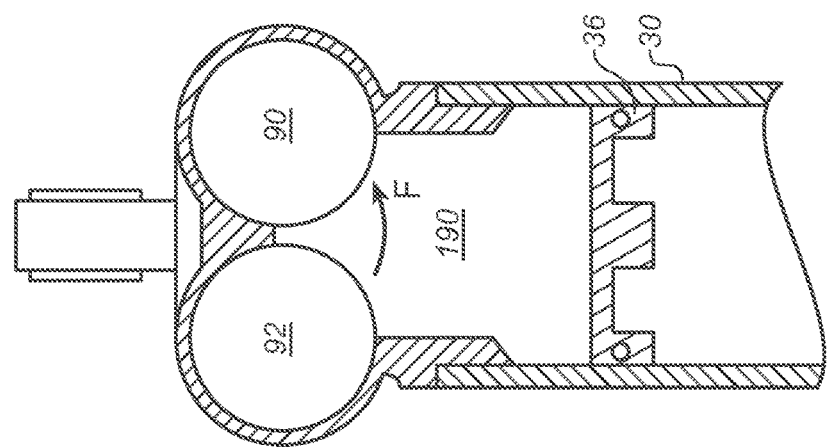
FIG. 13 is a partial sectional view of the interconnection housing of FIG. 1 at section 13-13, in accordance with an embodiment.

Referring now to FIGS. 11 to 13, the flow path of fluid during a compression stroke, i.e., when the piston 120 is moving inwardly of the damping cylinder 20, is shown. Where appropriate, reference will also be made to FIG. 2. Beginning at FIG. 12, the valved interconnection housing 40 is shown in cutaway to demonstrate the flow path into and out of the compression volume 108. The compression flow path C, shown in dashed line in FIG. 12, occurs when the size of the compression volume 108 is reduced by the moving of the piston 120 (FIG. 2) inwardly thereof. The fluid in the compression volume 108 flows from the compression volume 108, through the valve conduit 210 of the valved intermediate housing 40, and thence through the enlarged valve bore 214, through the compression piston valve 240 and thence into the open area 190 and the fluid volume 138 of the remote reservoir 30. As a result, the floating piston 36 will move within the remote reservoir 30 to reduce the size of the gas volume 136, thus increasing the gas pressure therein. As the fluid from the compression volume enters the open area 190 as a result of the inward stroke of the piston 120 in the damping cylinder 20 to increase the pressure in the open area 190, that pressure is communicated with the reservoir side of the rebound side valve piston 242. Simultaneously, the pressure in the rebound volume 109 (annular volume 106) of the rebound side valve piston 242 is decreasing, due to an expansion of the volume of the rebound volume 109. This reduced pressure is communicated to the rebound volume side of the rebound side valve piston 242 through the annular volume 106 of the damping cylinder 20 (FIG. 2), and thus, a lowering pressure condition is present on the rebound volume 109 side of the one side of the rebound piston valve 242, and an increasing pressure condition is present on the open area 190 side of the rebound piston valve 242. In a rebound stroke, the reverse flow occurs.

Referring to FIG. 14, the flow of the fluid from the fluid volume 138 into the valved interconnection housing 40 is shown. In FIG. 14, the flow is shown as a dashed line along arrow C' to distinguish it from the flow from the compression volume 108, as the fluid flowing may be fluid which originated in the compression volume 108, or may be fluid already present in the remote reservoir 30 and valved interconnection housing 40 when the compression stroke began. As shown in FIG. 14, fluid flows from the open area 190 of the valved interconnection housing 40 and into the large bore 226, into the enlarged valve bore 224 and through the rebound side valve piston 242 and thence through the rebound side passage 220 and into the annular manifold 228 which leads to the annular volume 106. This fluid then flows within the annular volume 106 to enable fluid in the annular volume 106 to flow through the plurality of passages 112 (FIG. 6) and thence into the rebound volume 109 (FIG. 2).

During a rebound stroke, where the piston 120 is moving in the damping cylinder 20 inner tube 102 in the direction away from the valved interconnection housing 40, the reverse of the fluid flow during a compression stroke occurs through the valved interconnection housing 40. As the piston 120 moves in the inner tube 102 in the direction away from the valved interconnection housing 40, the fluid pressure in the compression volume 108 of the damper cylinder inner tube 102 falls, and the pressure in the rebound volume 109 increases. Likewise, as the fluid is substantially incompressible, the fluid in the rebound volume flows out of the rebound volume 109, through the plurality of passages (FIG. 6) and into and through the annular volume 106, into the annular manifold 228, and thence through the rebound side passage 220 wherein the fluid pressure rises at the rebound volume 109 side of the rebound side valve piston 242. Simultaneously, because the volume within which the fluid in the compression volume 108 is present is increasing as the piston 120 withdraws, the pressure in the compression volume 108, and thus in the flow passages between the compression volume and the compression volume side of the compression piston valve 240 falls. (See FIG. 11.) When the fluid pressure at the rebound volume side of the rebound valve piston sufficiently exceeds the pressure on the open area side of the rebound valve piston, the shim on the open area side of the rebound valve piston will move to allow fluid to flow through the rebound valve piston and into the open area 190 and the fluid volume 138 of the remote reservoir 30. As a result, the higher pressure of the rebound volume 109 communicates to the open end side of the compression piston valve 240, and when the difference in the pressure on the opposed sides of the compression piston valve 240 is sufficient, the shim on the compression side of that valve will move to allow fluid, which is now at the pressure of the gas volume 136 of the remote reservoir 30 to pass into the compression volume 108. Thus, the compression volume 108 is rapidly brought to the gas pressure of the remote reservoir 30, thereby reducing the likelihood of cavitation in the fluid in the compression volume 108.

Figure 15:
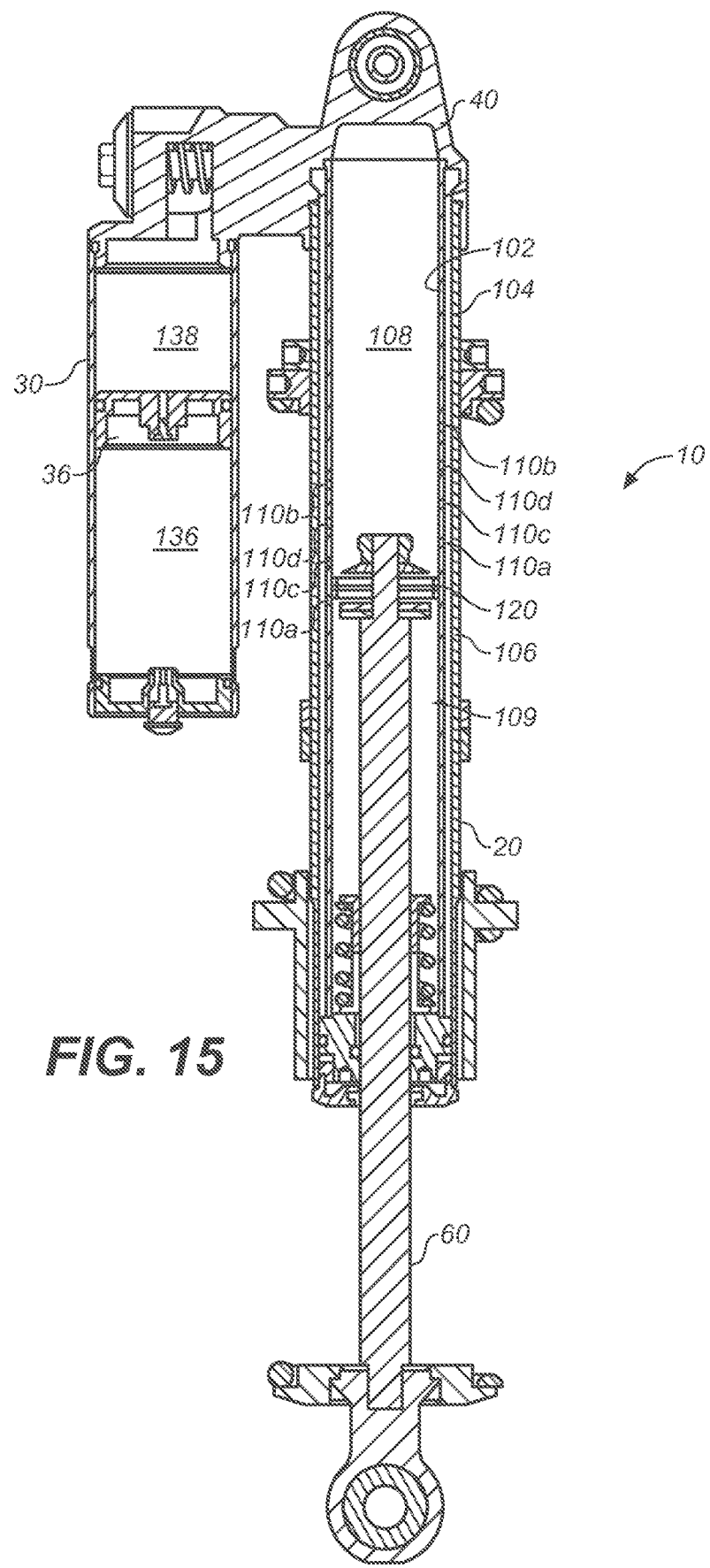
FIG. 15 is a sectional view of the damper of FIG. 1 showing a first position of the damping piston therein, in accordance with an embodiment.

As the piston 120 moves within the inner tube 102 of the damping cylinder 20, it will pass over one or more of the openings 110*a-d* located about the circumference of the inner tube 104. Thus, as previously described, secondary flow pathways, in total having different fluid flow capacities as the openings 110*a-d* are opened and closed on either side of the piston 120, are created. As shown in FIG. 15, the piston 120 has moved inwardly of the damping cylinder 20 such that the size of the rebound volume 109 has significantly increased, and the size of the compression volume 108 has significantly decreased, as compared to the sizes thereof in FIG. 2, wherein the damper 10 is in a relaxed or non-compressed state. As is shown in FIG. 15, the piston 120 has moved in the direction of the valved interconnection housing 40 to pass the first of the openings 110*a*, specifically 110*a*, to the left side of the figure, such that the annular volume 106 of the damping cylinder 20 now communicates between the compression volume 108 and the rebound volume 109. As a result of the reduction of the size of the compression volume 108, and the resulting flow of the fluid therein through the valved interconnection housing 40 and the remote reservoir 30, the gas piston 36 in the remote reservoir 30 has moved to reduce the size of the gas volume 136 of the remote reservoir 30. Likewise, as described previously herein, the fluid pressure in the annular volume 106 increases as fluid flows through the rebound side valve piston 242 from the open area 190 and into the annular volume 106 area. Initially, as the piston 120 moves from the position thereof of FIG. 2 to the position thereof shown in FIG. 15, the fluid is throttled because the cross sectional area through which it may flow to the rebound volume 109 is limited by the size of the plurality of passages 112 (FIG. 6). Once the piston 120 passes the lowermost of the opening 110*a*, the total area of the openings through which the fluid may flow from the annular volume 106 of the damping cylinder to the rebound volume 109 is increased by the cross sectional area of the opening 110*a*. Additionally, the movement of the piston rode 60 which moves the piston 120 inwardly of the damping cylinder 20 likewise moves the spring flange 86 (see FIG. 16) thereon in the direction of the damping cylinder 20, and thus compressing lower spring 74, and the increased spring force in the compressing lower spring 74 pushes upwardly 9 (in the direction of the valved interconnection housing 40) on the spring sleeve 82, which causes compression of the upper spring 72.

Figure 16:
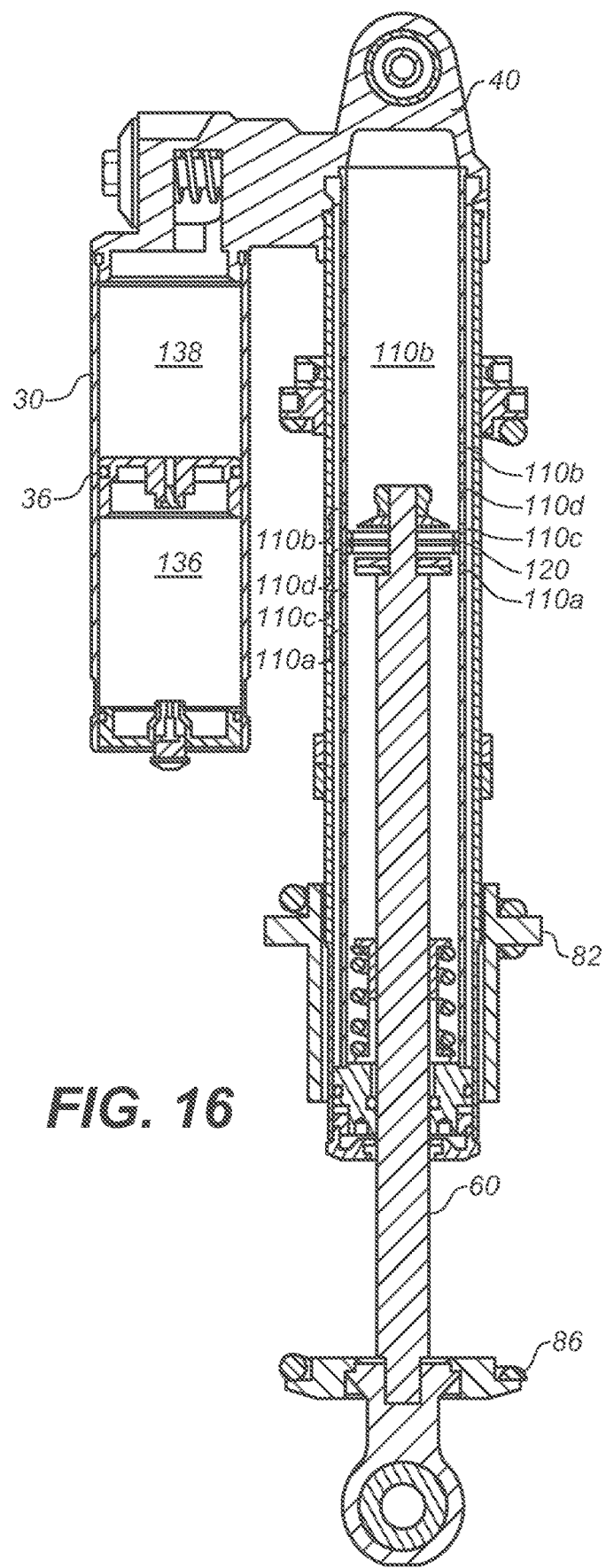
FIG. 16 is a sectional view of the damper of FIG. 1 showing a second position of the damping piston therein, in accordance with an embodiment.

As the piston 120 moves further inwardly of the damping cylinder 20, from the position thereof in FIG. 15 to the position as shown in FIG. 16, additional openings 110*b* and *d* on the left hand side of the inner tube 102 in FIG. 16, and additional opening 110*a* on the right hand side of the opening 110*a*, now communicate between the rebound volume 109 and the compression volume 108 through the annular volume 106 and the passages 112, further increasing the cross sectional area through which fluid may flow from the annular volume 106 of the damping cylinder 20 into the rebound volume 109 and thereby further reducing the damping force effect of the damper 10. Likewise, the floating piston 36 moves to further compresses the gas in the gas volume 136 of the remote reservoir 30, and the lower spring 74 and the upper spring 72 are further compressed and the spring sleeve 82 moves further in over the damping cylinder 20 in the direction of the valved interconnection housing 40.

Figure 17:
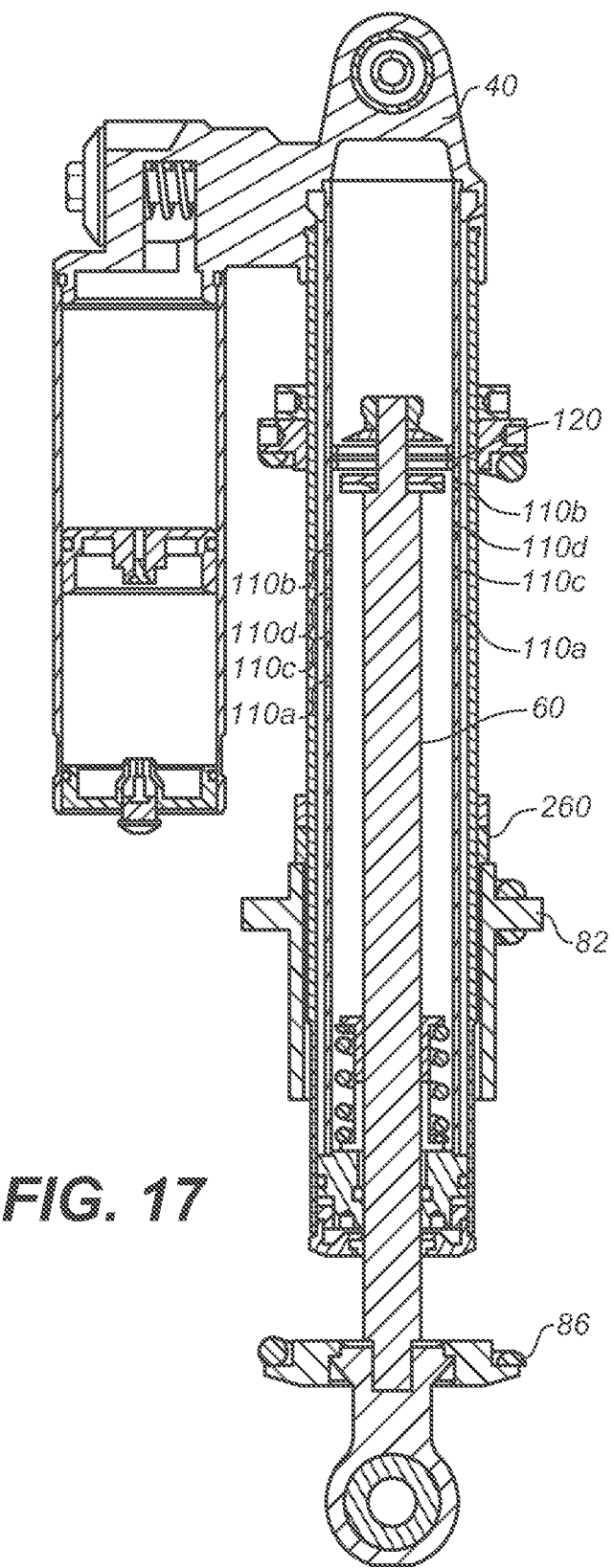
FIG. 17 is a sectional view of the damper of FIG. 1 showing a third position of the damping piston therein, in accordance with an embodiment.

FIG. 17 shows the piston 120 moved inwardly of the damping cylinder 20 at nearly the maximum stroke thereinto, opening all of the openings 110*a-d* to both sides of the damping cylinder 20 in the FIG. 17 to communication between the rebound volume and the annular volume 106. In this position, the spring sleeve 82 is moved nearly into contact with a limiting ledge 260 extending circumferentially from the outer surface of the damping cylinder outer tube 104, compressing the upper spring 72 and the lower spring 74 to near their maximum compression, and the floating piston 36 has further moved to further reduce the size of the gas volume 136 in the remote reservoir 30 and thus to the highest pressure of the gas therein. In this position, the maximum opening volume of the openings 110*a-d* communicates between the annular volume 106 and the rebound volume 109.

During a rebound stroke, when the piston 120 is moving outwardly of the damping cylinder 20 and the rebound volume 109 is shrinking and the compression volume 108 is expanding, the opposite flows occur. Thus, as the piston 120 moves form the position of FIG. 17 to the position thereof in FIG. 2, openings 110*b*, then 110*d*, 110*c* and 110*a* are sequentially passed, each passing of the piston 120 increasing the cross section of area through which the fluid may flow from the annular volume 106 to the compression volume 108. Likewise, as described previously herein, the fluid in the rebound volume 109 initially passes through openings 112 (FIG. 6) and openings 110*a-d* into the annular volume, and then through the valved interconnection housing 40 into the common area 190. From the common area 190, the fluid may also flow into the compression volume 108. Simultaneously, where the pressure in the gas volume 138 is initially higher than the pressure in the compression portion, or the fluid pressure in the compression volume 108 is falling in comparison to the pressure in the gas volume 138, the gas volume 138 will expand to force fluid therein to flow directly into the compression volume 108.

Figure 18:
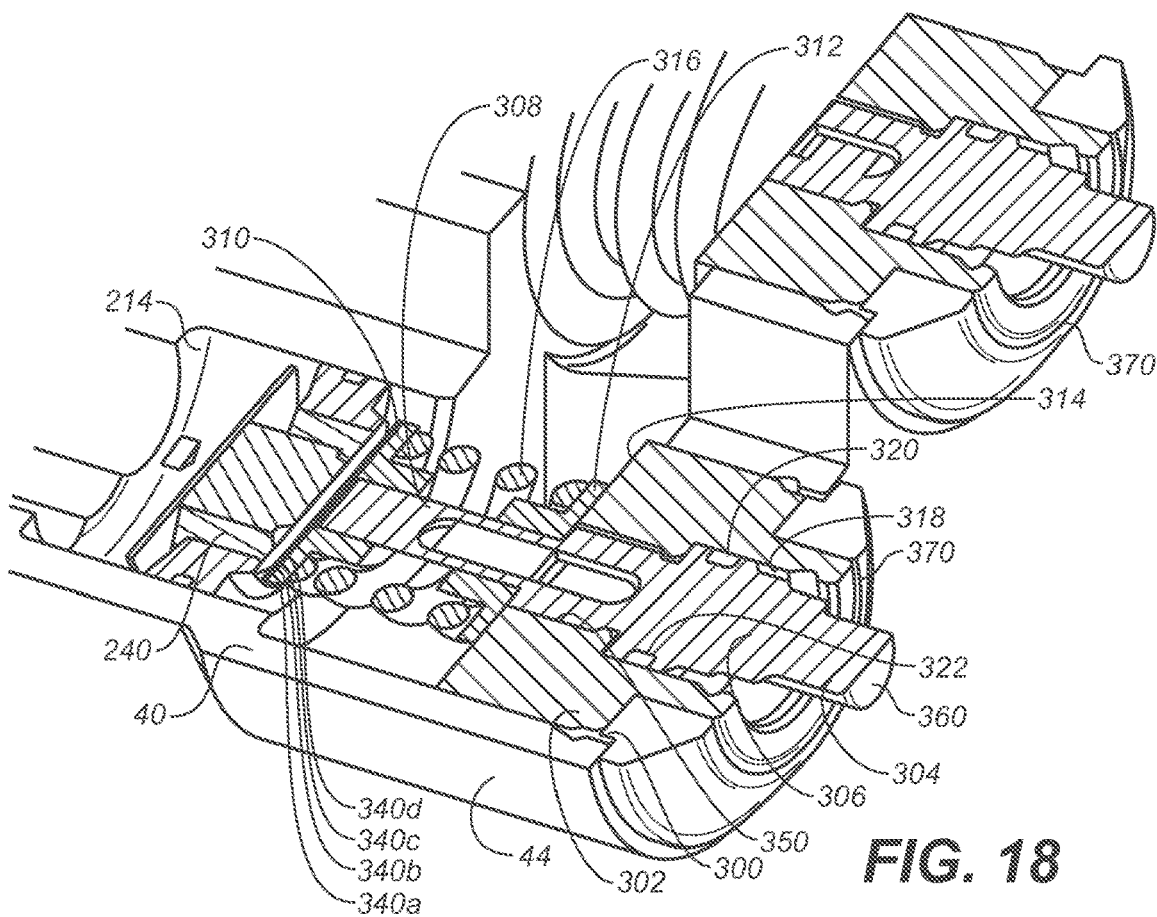
FIG. 18 is an enlarged partial sectional view of the interconnection housing of FIG. 1 showing the details of a valve thereof, in accordance with an embodiment.

Referring now to FIG. 18, which is an enlarged view of the compression valve 92 and a portion of the valved interconnection housing 40 within which the compression valve 92 is seated, the configuration of the rebound valve 90 and compression valve 92 is shown in detail. The rebound valve 90 and the compression valve 92 are substantially identical in construct, and thus the configuration of the compression valve 92 will be discussed in detail, the description applicable to both the rebound valve 90 and the compression valve 92.

The compression valve 92 is secured within an opening 300 in the boss 44 of the valved interconnection housing 40, and includes a sealing head portion 302 which is removably secured in the opening 300 of the boss 44, and from which an adjustment member 304 extends inwardly of the valved interconnection housing 40 and is secured, at the inwardly projecting end thereof, on or within the compression valve piston 240. The adjustment member 304 includes a seal head portion (enlarged head) 306 portion, from which a shaft 308 extends inwardly of the valved interconnection housing 40 from the sealing head portion 302 and into or onto the compression valve piston 240 at the center of a circumference thereof. Surrounding the connection of the shaft 308 and the compression piston valve 240 is a first spring guide 310 which is free to move axially and rotationally about the shaft 308. A second spring guide 312 is positioned, about the circumference of the shaft 308, generally against the inner terminal face 314 of the sealing head piston 302, and coil spring 316 is disposed about the outer surface of the shaft 308 and between the first spring guide 310 and the second spring guide 312. Additionally, about the outer perimeter of the shaft 308 at the adjacent surface of the compression piston valve 240 are disposed a plurality of shim members 340a-d, similar in construct to those of FIG. 5, and each adjacent shim member 340a-d having a different outer diameter or outermost span, as measured from a center thereof, as compared to the next adjacent shim of shim members 340a-d. In construct, the shim 340a of the largest span or diameter is positioned to overlay the valve bore 342 of the compression piston valve 240, and the closest shim thereto 340b has a smaller diameter, the next shim 340c an even smaller diameter or span, and the outermost shim 340d of the smallest span. Although four shims 340a-d are described, a smaller or larger number may be employed. The largest shim 340a is configured to selectively cover and seal off first passages 342 extending through the compression piston valve 240 as will be described herein. On the opposed side of the compression piston valve 240, a single shim, configured to selectively cover and thus seal off only second passages (not shown) of the compression piston valve 240 is provided.

Referring to FIGS. 11 and 18, by having the enlarged head 306 threadingly secured within a threaded bore 318 of the seal head portion 302, the compression piston valve 240 is positionable within the enlarged valve bore 214 of the housing 40. Threads 320 of the threaded bore 318 engage threads 322 on the enlarged head 306, and thus rotation of the adjustment member 304 in the bore of the seal head portion 302 causes the compression piston valve 240 to move away, or toward, the inner terminal face 314 of the seal head portion 302. The total stoke of the compression side (or, rebound side) of the compression piston valve 240 is limited in the retraction from the enlarged valve bore 214 direction by the compressed length of the coil spring 316. Hence, the compression (and rebound piston valve) piston valve 240 are maintained to travel only within the depth or length of the enlarged valve bore 214. As shown in FIG. 11 the rebound valve piston position has been adjusted, relative to that of the compression piston valve 240, in the manner described above. Because the first spring guide 310 and the second spring guide 312 are located about the shaft 308, and further bounded by the shims 340a-d in one axial direction of the shaft 308 and the inner terminal face 314 or the seal head portion 302, drawing the compression piston valve 240 toward the seal head portion 302 by turning the enlarged head compresses the coil spring 316, and the opposite rotation direction increases the compression piston valve 240 to seal head portion 302 distance thereby reducing the spring compression. The minimum distance between the outermost shim 340d and the inner terminal face 314 at which the spring 316 will begin to become compressed, is the un-compressed height (i.e., free length) of the coil spring 316 plus the thickness of the flanges 311 on the first spring guide and the second spring guide 312. Thus, by adjusting the rotational position of the enlarged head 306 in the seal head portion 302, the relative position of the compression piston valve 240, and thus, the outermost shim 340d, and the inner terminal face 314 can be less than the minimum distance at which the coil spring 316 will begin to be depressed, and thus the force of the coil spring 316 bearing against the outermost shim 340d, and the stiffness of the coil spring 316, may be varied between minimum stiffness, when the compression (or rebound piston valve) piston valve 240 is fully extended inwardly of the enlarged bore 214 and fully stiff force, when the spring is fully compressed when the piston is fully retracted within the enlarged bore 216 in the direction of the seal head portion 302. At the furthest extension of the compression piston valve 240 from the inner terminal face 314 of the seal head portion 302, the coil spring 316 may be in a totally uncompressed state, and, if desired by a user, the piston position may be adjusted so that the span between the flanges 311 of the opposed spring guides 310, 312 is greater than the free height or uncompressed length of the coil spring 316. Alternatively, by rotating the enlarged head 306 in the seal head portion 302, the spring guides may be brought closer together, to a span less than the minimum distance, thereby preloading the spring against the flanges and thus preloading an additional spring force against the outermost shim 340d. Continued turning of the enlarged head 302 in the seal head portion 302 will further increase the load of the preloading of the coil spring 316 on the outermost shim. Ultimately, it is contemplated that the span between the first spring guide 310 and the second spring guide 312 is equal to the free height of the coil spring 316, and in that case the maximum force may be preloaded against the outermost shim 340d.

In operation, as the piston 120 in the damper inner tube 102 moves in a compression stroke, hydraulic fluid pressure is increased in the enlarged bore 214 against the damper side face of the compression piston valve 240 and thus the passages 342 extending therethrough. When the fluid pressure force acting on the damper side of the shim 340a exceeds the combined spring force of the shim stack 340a-d, the coil spring 316 force on the shim stack 340a-d (if any) and the fluid pressure on the reservoir side of the shim stack 340, the shim stack 340 can lever or bend away from the face of the compression piston valve 240 at the passages 342 similarly to the opening of a shim 124/124' shown in FIG. 10. Thus, it can be appreciated that during a compression stroke, the stiffness of the damper, is a function of the resistance to fluid flow through the several pistons (piston 120, and compression piston valve 240 and rebound valve piston) the sidewall openings 110 and passages 112 associated with the inner tube 102 of the damper 10, and thus the damping rate can be adjusted by adjusting the rotational position of the enlarged head 306 in the seal head portion 302 to increase or decrease the resistance of the shim stack 340 to opening the passages 342. Additionally, as the rebound valve 90 has the same construct as the compression valve 92, the quantity of fluid moving through the first passage 342 will not result in a significant pressure rise on the reservoir side of the compression piston valve 240, because fluid may be readily vented from that volume through the second passage of the rebound valve piston where only a single shim, which is not affected by spring loading, is provided to cover the opening from the reservoir back to the annular volume 106 of the damper 10. The stiffness of the single shim on the second passage is selected to be less than that of the shim stack 340a-d. Thus, after a slight pressure rise in the rebound volume 109 during a compression stroke, the pressure is relieved via flow through the passages on the rebound piston valve 242 of the valved interconnection housing 40. Thus, during damping, the reservoir pressure, or nearly the reservoir pressure, may be maintained throughout the damper 10, reducing or eliminating cavitation which can occur when the pressure on the rebound side otherwise drops as a result of a rapid increase in the volume of the rebound side of the main housing.

During a rebound stroke, the reverse of the fluid pressure situations, and fluid flows, occur, such that the rebound pressure at the rebound side of the rebound piston valve 242 exceeds the cumulative forces on the reservoir side of the shim stack, to cause fluid from the rebound side of the piston 120 to begin flowing through passages 112 and into the annular volume 106, into the opening 128 (e.g., annulus), and thence increase pressure at the rebound volume 109 side of the rebound side where the rebound piston valve 242 on rebound valve 90 has greater spring force acting against the shim stack thereof as compared to that of the compression piston valve 240 of the compression valve 92, because the compression of the coil spring 316 on the rebound valve 90 is greater than that on the compression valve 92. The stiffness of the single shim controlling flow through the second opening of the rebound valve 90 and the compression valve 92 may be set in consideration of the desired release of the pressure in the rebound or compression stroke in the reservoir volume.

Figure 19:
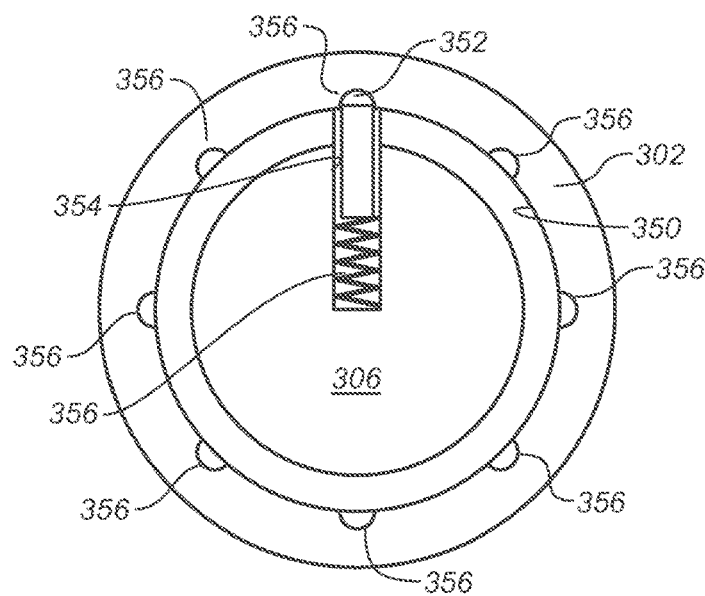
FIG. 19 is a sectional view of a valve of the interconnection housing showing details of the detent system thereof, in accordance with an embodiment.

Referring to FIG. 19, a detent system to releasably fix the rotational position of the shaft 306 in the seal head portion 302 may be provided. The shaft 306 extends through a smaller diameter bore 350 of the seal head portion 302, and includes therein a finger or cam 352 located in a radially extending slot 354 aligned along the axis of the shaft 308, and having a detent spring 356 located between the base of the radially extending slot 354 and the underside of the cam 352 within a slot to urge the cam outwardly of the radially extending slot 354 beyond the outer circumference of the shaft 308. Within the smaller diameter bore 350 of the seal head portion 302 are provided one or more detent springs 356 (eight shown in FIG. 19) extending inwardly of the inner circumferential surface of the smaller diameter bore 350. Where more than one detent spring 356 is provided, they are equally circumferentially spaced along the inner face of the smaller diameter bore 350 as is shown in FIG. 19.

As shown in FIG. 18, the enlarged head 306 terminates, outwardly of the compression valve 92, in a tool boss 360. The tool boss 360 is configured to receive a tool therein, which can supply torque to cause rotation of the shaft 306 within the seal head 304. Thus, it may be configured to include a screwdriver slot or a hex head wrench recess, or may extend outwardly in a hexagonal profile for location for a wrench thereover. In this aspect, by providing specific detent springs 356 into which the cam 352 can engage, the user of the damper can feel the adjustment degree of the coil spring 316 by specific passing of the cam 352 through one or more detent springs 356, and place the cam 352 in a specific detent spring 356 relating to a compression setting of the coil spring 316 and thus stiffness of the damper 10. For example, the tool boss 360 may include an alignment mark thereon and the boss of the valved interconnection housing 40 may include a number sequence corresponding to the position of the cam 352 in the detent spring 356, allowing rapid user understanding of the stiffness setting. Alternatively, a dial structure or knob may be connected to the outer terminus of the shaft, and include numerical settings thereon which can align with a mark on the outer surface of the bosses 42, 44 to indicate the rotational setting of the shaft 308 in the seal head portion 302.

The rebound valve 90 and the compression valve 92 are configured for rapid attachment or detachment from the valved interconnection housing 40, such as by a threaded annular cap 370 extending about the outer surface of the seal head portion 306 and secured in threads in the bore 300, or, by use of a snap ring and groove system, or other readily openable securement mechanisms. Additionally, the outer circumferential surface of the seal head portion 306 includes a seal bore therein, and a seal such as an o-ring is secured therein the seal the seal head 306-bore 300 interface. Thus, valves having different coil spring 316 stiffness can be readily interchanged for use in the rebound valve 90 and the compression valve 92. Likewise, the mechanically adjusted valves may be automated by employing small servo motors, connected to the enlarged head 306, to cause rotation thereof within the seal head portion 306. As a result, the coil spring 316 stiffness/force against the shims 340a-d may be remotely adjusted, and on the fly as the user vehicle is in motion.

There has been described herein a twin tube damper 10, having a main damping volume surrounded by an annular volume in communication with the rebound and compression sides of the main volume, and an interconnected gas reservoir, wherein the outer tube (annular volume) of the twin tube (inner and annular volume) is communicable with both the compression and rebound sides of the damper, and in which the inner and outer tube volumes of the twin tube are also communicable with the gas reservoir through independent valved access passages. In operation, as described herein, during a compression stroke of the piston 120 of the damper 10, hydraulic fluid may move from the compression to the rebound side of the piston through the outer tube (annular volume 106) as well as through the valved openings in the piston 120, and, fluid pressure increases at the compression volume side of the compression piston valve 240 whilst simultaneously reduces at the rebound side of the rebound piston valve 240 in the compression housing. In the event of a slow compression stroke, the flow capacity of the openings 110a-d in the wall of the inner tube is sufficient to maintain sufficient flow under the increased pressure on the compression side and decreased pressure on the rebound side of the piston 120 so as to not cause opening of the shim 126 in the piston 120, or the shim stack 340a-d on the compression piston valve 240. Where the compression stroke has a higher velocity, such that the volume of fluid needing to be displaced exceeds the flow capacity of the openings 110a-d, the shim 126 will open to open piston opening 130 and thus increase the flow volume area between the compression and rebound volumes, 108 and 109, respectively, and thus reduce the fluid resistance of the piston 120 moving in the inner tube 102. If a very rapid acceleration or velocity of the piston 120 is encountered in a compression stroke, where the rebound volume 109 of the damper 10 is rapidly expanding and the fluid therein would otherwise reach a sufficiently low pressure that cavitation would occur, the shim stack 340a-d will open to open the passage through the compression piston valve 240 in the valved interconnection housing 40, immediately relieving the low pressure condition on the rebound side of the volume and preventing cavitation of the fluid therein. Likewise, in a rebound stroke, if too rapid movement of the piston 120 in a rebound stroke occurs, the shim stack 340a-d on the gas piston side of the rebound piston valve 240 in the valved interconnection housing 40 will open, causing immediate pressure relief and restoration on the compression volume 108 side of the piston 120.

The rebound and compression piston valves 240 also serve to damping the piston 120 movement, and, upon the opening of the piston 240 passage by the shim stack 340a-d in a compression stroke, provide an additional reduction in the resistance to the piston 120 movement in the compression direction in the inner tube 102 of the damper 10, and an additional reduction in the resistance to the piston 120 movement in the rebound direction in the inner tube 102 of the damper 10 in a rebound stroke. The ability of a user to independently select pressure at which the shim stack 340a-d will open, by varying the spring force against the back side of the shim stack, allows user customization of the feel of the ride and thereby enhances user enjoyment of the vehicle on which the damper is mounted. Furthermore, the user may select one set of rebound valve 90 and compression valve 92 spring setting for off road use, and another for road use, or even change them as conditions of road or off-road use change, to maximize the user's ride experience. Furthermore, a user may change the entire valve structure rapidly, and thus substitute a compression or rebound valve having different spring constants and/or lengths, and thus different loading characteristics, for a different ride experience.

While the foregoing is directed to embodiments of the present invention, other and further embodiments of the invention may be devised without departing from the basic scope thereof, and the scope thereof is determined by the claims that follow.

I claim:

1. A fluid damper comprising:
   an inner tube forming an inner fluid volume;
   an outer tube forming an outer fluid volume;
      at least one flow passage extending through said inner tube to enable fluid communication between said inner fluid volume and said outer fluid volume, wherein at least one opening of said flow passage is not formed in a side wall of said inner tube;
   a remote reservoir in fluid communication with said inner fluid volume and said outer fluid volume, said remote reservoir comprising:
      a fluid portion;
      a gas portion; and
      a floating piston separating said fluid portion and said gas portion;
   a valved interconnection fluidically coupling said remote reservoir with said inner fluid volume and said outer fluid volume, said valved interconnection comprising:
      a first flow passage extending between said inner fluid volume and said fluid portion of said remote reservoir;
      a second flow passage extending between said outer fluid volume and said fluid portion of said remote reservoir; and
      at least one valve interposed in at least one of said first flow passage and said second flow passage, wherein said at least one valve controls fluid flow through said at least one of said first flow passage and said second flow passage; and
   a damping piston moveable within said inner tube and connected to a shaft extending outwardly of said inner tube through a sealed end thereof, movement of said damping piston enabling fluid to flow between one side of said damping piston and said fluid portion of said remote reservoir via said valved interconnection and at least one of said inner fluid volume and said outer fluid volume, said damping piston sealingly isolates said inner tube into a compression volume and a rebound volume.

2. The fluid damper of claim 1, wherein said damping piston sealingly isolates said inner tube into a compression volume and a rebound volume, wherein said rebound volume is in continuous fluid communication with said outer fluid volume of said outer tube.

3. The fluid damper of claim 2, wherein said outer fluid volume is an annular volume extending around said inner fluid volume.

4. The fluid damper of claim 3, wherein reaching a threshold of a difference in fluid pressure across said at least one valve in said first flow passage and said second flow passage, thereby achieving a threshold difference in fluid pressure, causes an opening of said at least one valve to open to fluid flow therethrough.

5. The fluid damper of claim 4, wherein a level of said threshold difference in fluid pressure of said at least one valve is adjustable.

6. The fluid damper of claim 4, wherein a level of said threshold difference in fluid pressure of said at least one valve in said first flow passage is independently adjustable with respect to a level of said threshold difference in fluid pressure of said at least one valve in said second flow passage.

7. The fluid damper of claim 5, wherein a valve of said at least one valve comprises:
   a through hole extending therethrough, and a bendable shim extending across said opening, wherein a bending of said bendable shim away from said opening enables opening of said fluid passage to flow therethrough; and
   a spring plate biased by a spring to selectively press against said shim to urge said shim in a direction to close said opening of said valve of said at least one valve.

8. The fluid damper of claim 7, wherein said inner tube comprises:
   a plurality of openings spaced in a direction of travel of said piston therein and extending between said inner fluid volume and said outer fluid volume, said plurality of openings being in an annular wall of said inner tube, and said movement of said position of said piston therein exposes different ones of said openings to said fluid volume of said inner tube on either side of said piston.

9. The fluid damper of claim 8, wherein at least a first opening and a second opening of said plurality of openings in said inner tube are spaced part, in a direction of said piston travel, by a gap greater than a width in said piston.

10. The fluid damper of claim 9, wherein said piston is disposed intermediate of said first opening and said second opening, such that, during a stroke of said piston in said direction of said first opening, a first portion of fluid flows from a first side of said piston, through said first opening in said annular wall, and a second portion of fluid simultaneously flows through said second of said openings and into a volume at said second side of said piston.

11. The fluid damper of claim 10, wherein said first opening and said second opening are in fluid communication through an annular volume extending around an inner volume.

12. A fluid damper, comprising:
   a first fluid volume partially bounded by a sealed opening through which a piston shaft extends inwardly and outwardly of said first fluid volume, said piston shaft having a piston coupled thereto, said piston located within said first fluid volume, said piston disposed to separate said first fluid volume into a compression side and a rebound side;

a first fluid pathway between said first fluid volume and an outer fluid volume wherein at least one opening of said fluid pathway is not formed in a side wall of an inner tube;

a reservoir comprising:
  a gas portion; and
  a fluid portion separated from said gas portion; and a valved interconnection housing, wherein said valved interconnection housing includes a first valved flow passage extending between said compression side of said first fluid volume and said fluid portion of said reservoir.

13. The fluid damper of claim 12 wherein said valved interconnection housing further comprises
  a second valved flow passage extending between said rebound side of said first fluid volume and said fluid portion of said reservoir.

14. The fluid damper of claim 13, wherein at least one valve of said first valved flow passage and said second valved flow passage are adjustable to select a pressure at which they open.

15. The fluid damper of claim 14, wherein said at least one valve of said first valved flow passage and said second valved flow passage are independently adjustable, with respect to each other, to select said pressure at which they open.

16. A fluid damper, comprising:
  an inner tube and an outer tube, said outer tube at least partially surrounding said inner tube, said inner tube and said outer tube at least partially defining an inner fluid volume and an outer fluid volume;
  a damping piston moveably disposed within said fluid damper, said damping piston coupled to a piston shaft, said piston shaft moveable into said inner tube and also moveable out of said inner tube via a sealed opening;
  a first fluid pathway between said inner fluid volume and said outer fluid volume wherein at least one opening of said fluid pathway is not formed in a side wall of said inner tube;
  a reservoir, said reservoir further comprising:
    a pressurizable gas volume;
    a fluid volume; and
    a floating piston, said floating piston disposed between said pressurizable gas volume and said fluid volume;
  a first valved passage extending between said inner fluid volume and said fluid volume of said gas reservoir;
  a second valved passage extending between said outer fluid volume and said fluid volume of said gas reservoir; and
  a valve disposed in at least one of said first valved passage and said second valved passage, operation of said valve at least partially based upon a threshold value of a difference in pressure across said valve.

17. The fluid damper of claim 16, wherein said first valved passage is located in a valved interconnection housing.

18. The fluid damper of claim 16, wherein said second valved passage is located in a valved interconnection housing.

19. The fluid damper of claim 16, wherein said first valved passage and said second valved passage are located in a valved interconnection housing.

20. The fluid damper of claim 16, wherein said threshold value is adjustable.

* * * * *